(12) United States Patent
Lee

(10) Patent No.: US 11,317,470 B2
(45) Date of Patent: Apr. 26, 2022

(54) NETWORK SYSTEM, NETWORK DEVICE APPLIED THERETO AND OPERATION METHOD FOR NETWORK DEVICE, AND OPERATION METHOD FOR NETWORK NODE

(71) Applicant: SK TELECOM CO., LTD., Seoul (KR)

(72) Inventor: Dong Jin Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 16/759,464

(22) PCT Filed: Oct. 29, 2018

(86) PCT No.: PCT/KR2018/012914
§ 371 (c)(1),
(2) Date: Apr. 27, 2020

(87) PCT Pub. No.: WO2019/088621
PCT Pub. Date: May 9, 2019

(65) Prior Publication Data
US 2020/0288538 A1 Sep. 10, 2020

(30) Foreign Application Priority Data

Oct. 30, 2017 (KR) .......................... 10-2017-0142371
Oct. 26, 2018 (KR) .......................... 10-2018-0129103

(51) Int. Cl.
*H04W 88/14* (2009.01)
*H04W 48/16* (2009.01)
*H04W 88/08* (2009.01)
*H04W 24/02* (2009.01)

(52) U.S. Cl.
CPC .......... *H04W 88/14* (2013.01); *H04W 24/02* (2013.01); *H04W 48/16* (2013.01); *H04W 88/08* (2013.01)

(58) Field of Classification Search
CPC ..... H04W 88/14; H04W 48/16; H04W 88/08; H04W 24/02
See application file for complete search history.

(56) References Cited

U.S. PATENT DOCUMENTS

| 2017/0070892 A1 | 3/2017 | Song et al. |
| 2017/0289791 A1 | 10/2017 | Yoo et al. |
| 2020/0229206 A1* | 7/2020 | Badic .................... H04W 4/023 |

FOREIGN PATENT DOCUMENTS

| KR | 10-2017-0030058 | 3/2017 |
| KR | 10-2017-0078799 | 7/2017 |
| KR | 10-2017-0114923 | 10/2017 |

OTHER PUBLICATIONS

International Search Report dated Jan. 25, 2019 issued in Application No. PCT/KR2018/012914.

(Continued)

*Primary Examiner* — Diane D Mizrahi
(74) *Attorney, Agent, or Firm* — KED & Associates LLP

(57) ABSTRACT

Disclosed is a control function transfer technology that moves/loads a control function, contained in a network node (NF), into another NF, so that signalings among respective NFs which occur during signaling processing associated with a UE may be reduced and a delay in signaling processing with respect to the UE may be reduced.

10 Claims, 10 Drawing Sheets

(56) References Cited

OTHER PUBLICATIONS

Lee, Seung Ik et al. "Standardization Trends in Network Slicing and Management Technologies of 5G Core Network", Electronics and Telecommunications Trends, vol. 32, No. 2, Apr. 1, 2017, pp. 62-70.
Jeon, Seil, "Network Slice Selection for 5G Services: Review and Challenges", KICS Summer Conference 2017, Proceedings of The Korean Institute of Communications and Information Sciences (KICS) Conference, Jun. 2017, pp. 1529-1530.
Lee, Seung Ik et al. "5G Network Slicing Technology", OSIA S&TR Journal, vol. 29, No. 4, Dec. 2016, pp. 1-15.
Korean Office Action dated Sep. 3, 2019 issued in Application No. 10-2018-0129103 (English translation attached).

* cited by examiner

[Service 1]

FIG. 10

| mNF Name / ID | Component (Library / Package / Patch / Plug-Ins...) | Component Version | Description | Resouce Size | amount of resources (CPU, Memory, Network) | Requirement for Execution | Description |
|---|---|---|---|---|---|---|---|
| IoT_Session_ v0.2 | Signal_Proc | v0.1 | · Process for IoT signaling session | ... | ... | · CFH v0.1 | ... |
| | IoT_API | v1.0 | · Main API set for IoT | ... | ... | · CFH v0.9 | ... |
| | Auth_Gen | v0.9 | · Key generator | ... | ... | · CFH v0.94 | ... |
| | IP_Mgmt | v1.0 | · Simple IPv4 support | ... | ... | · CFH v1.0 | ... |
| | Mem_Lock | v2.1 | · Memory lock code | ... | ... | · CFH v0.7 | ... |
| | ... | | | | | ... | ... |

NETWORK SYSTEM, NETWORK DEVICE APPLIED THERETO AND OPERATION METHOD FOR NETWORK DEVICE, AND OPERATION METHOD FOR NETWORK NODE

BACKGROUND OF THE INVENTION

1. Field of the Invention

The present disclosure relates to a control function transfer technology that moves or loads a control function contained in a network node into another network node.

This application is a U.S. National Stage Application under 35 U.S.C. § 371 of PCT Application No. PCT/KR2018/012914, filed Oct. 29, 2018, which claims priority to Korean Patent Application Nos. 10-2017-0142371, filed on Oct. 30, 2017 and 10-2018-0129103, filed on Oct. 26, 2018, in the Korean Intellectual Property Office, the disclosure of which is herein incorporated by reference in its entirety.

2. Description of the Prior Art

A 5G communication system accommodates as many user equipments (UEs) as possible based on limited radio resources, and supports various service types such as an enhanced mobile broadband (eMBB)/massive machine type communications (mMTC)/ultra-reliable and low latency communications (URLLC), and the like.

Particularly, a URLLC service supported in the 5G communication system is very important in terms of usability by a user of a UE. Various researches are being conducted in order to support the same.

In 5G, a network structure is defined to support a UE, a base station (access), a core, and a server end to end.

Particularly, in 5G, unlike the legacy LTE (4G), a network structure separately defines an area of a control signaling function (control plane) and an area of a data transmission/reception function (user plane).

In this instance, a network node in the control plane of 5G may define an Access and Mobility Function (AMF) of controlling radio access of a UE, an Authentication Service Function (AUSF) of controlling an authentication procedure that authenticates whether a user is a legitimate subscriber, a Policy Control Function (PCF) of managing/controlling policy such as, subscriber information, subscription service information for each subscriber, payment, or the like, a Session Management Function (SMF) of managing/controlling a session for the use of a data service for each UE, a Network Repository Function (NRF) of managing/controlling information associated with each network node in a network, a Network Exposure Function (NEF), a network slice selection function (NSSF), a user data management (UDM), an application function (AF), or the like.

Each network node in the control plane may perform a unique control function that each network node is in charge of, and the control function is referred to as a network function (NF).

A network node in the user plane of 5G may be defined as a user plane function (UPF) that performs data transmission or reception between a UE and a server on a data network (e.g., Internet) via a session with the UE based on the control (interworking) of an SMF.

In 5G, when signaling processing associated with a UE is performed, each network node, that is, each NF performs a control function that each NF is in charge of and processes signaling, so that a large number of signalings are transmitted or received between NFs.

Accordingly, in 5G, since a large number of signalings are transmitted or received between physically independent NFs, a delay may occur according to latency for each signaling between NFs when signaling processing associated with a UE is performed.

However, in 5G, it is impossible to remove a significant delay which is caused by a large number of signalings between physically independent NFs when signaling processing associated with a UE is performed.

The present disclosure is to provide a method of reducing a delay of signaling processing associated with a UE by reducing signalings between respective NFs which occur when signaling is processed associated with the UE.

SUMMARY OF THE INVENTION

The present disclosure is to provide a method of reducing a delay that occurs when signaling processing associated with a user equipment (UE) is performed, by reducing signalings between respective NFs that occur during signaling being processed associated with a UE.

In accordance with an aspect of the present disclosure, a network system may include: a plurality of network nodes containing at least one control function; and a control node configured to load a predetermined control function of a predetermined network node, which needs separation of a control function from among a plurality of network nodes, into another network node selected from among the plurality of network nodes.

When the control node requests separation of a control function to the predetermined network node, and receives a context information response associated with a separable predetermined control function from the predetermined network node, the control node selects another network node which is capable of implementing the predetermined control function based on the context information from among the plurality of network nodes.

The control node allows the predetermined control function separated from the predetermined network node and the context information to be transferred the another network node, so as to load the predetermined control function into the another network node.

In accordance with an aspect of the present disclosure, a network device may include: a control function unit configured to contain at least one control function; a separation unit configured to distinguish a separable predetermined control function based on user context information from among the at least one control function to separate the predetermined control function; and a controller configured to provide at least one of the separated predetermined control function and the user context information to a control node, so that the predetermined control function is loaded into another network device, which is selected by the control node based on the user context information.

The another network device is one of network devices located closer to a user equipment (UE) than the network device in a signaling procedure with the UE, from among a plurality of network devices.

The controller is configured to provide the predetermined control function and the user context information to the another network device, or to allow the another network device to copy the predetermined control function and the user context information, so as to load the predetermined control function into the another network device.

The control function unit is configured to manage and update information associated with the predetermined control function from among the at least one control function, according to update information received from the predetermined control function of the another network device continuously or periodically.

In accordance with an aspect of the present disclosure, a network device may include: a control function unit configured to contain at least one control function; and a controller configured to obtain a predetermined control function separated from another network device based on user context information and load the predetermined control function of the another network device into the network device, wherein each control function of the control function unit is configured to transfer a predetermined signaling associated with the user context information which needs to be transmitted to the predetermined control function of the another network device from among signalings associated with a UE, to the predetermined control function of the controller, so as to enable the predetermined signaling to be processed in the network device.

The predetermined control function is loaded and maintained in the controller during a predetermined loaded state time after loading, or until the amount of resources other than resources required for performing a control function of the control function unit becomes insufficient to perform the predetermined control function becomes insufficient.

When the amount of resources other than resources required for performing a control function of the control function unit becomes insufficient to perform the predetermined control function, each control function of the control function unit is configured to transfer the predetermined signaling to the predetermined control function of the another network device.

In accordance with an aspect of the present disclosure, an operation method of a network device may include: a separation operation configured to distinguish a separable predetermined control function based on user context information from among at least one control function contained in advance, and to separate the predetermined control function; and a function control operation configured to provide at least one of the separated predetermined control function and the user context information to a control node, so that the predetermined control function is loaded into another network device selected by the control node based on the user context information.

The method may further include: providing, by the control node, the predetermined control function and the user context information to the another network device, or allowing the another network device to copy the predetermined control function and the user context information, so as to load the predetermined control function into the another network device.

The method may further include: managing and updating information related to the predetermined control function from among the at least one control function, according to update information received from the predetermined control function of the another network device continuously or periodically.

In accordance with an aspect of the present disclosure, an operation method of a network device may include: a containing operation configured to contain at least one control function in advance; an obtaining and loading operation configured to obtain a separated predetermined control function based on user context information from another network device, and to load the predetermined control function of the another network device into the network device; and a signaling operation in which the at least one control function transfers a predetermined signaling associated with the user context information which needs to be transferred to the predetermined control function of the another network device from among signalings associated with a UE, to the predetermined control function of the controller, so that the predetermined signaling is processed in the network device.

The predetermined control function is loaded and maintained in the network device, during a predetermined loaded state time after loading, or until the amount of resources other than resources required for performing a control function of the control function unit becomes insufficient to perform the predetermined control function.

The method may further include: transferring, by the at least one control function, the predetermined signaling to the predetermined control function of the another network device when the amount of resources other than resources required for performing a control function of the control function unit becomes insufficient to perform the predetermined control function.

In accordance with an aspect of the present disclosure, an operation method of a network node that supports a predetermined service may include: loading at least one control function for operations of the network node; processing a signaling associated with a UE by performing the at least one control function and transferring the signaling between control functions; and storing result information related to signaling processing in a predetermined data storage related to the predetermined service but not retaining the result information in the control function every time that the signaling is processed in each control function.

The result information includes user context information associated with at least one of the UE, a service of signaling, and state information of a control function that performs signaling processing.

The control function includes at least one component in the form of software, in order to perform the control function, and the at least one component has a signaling input function, a signaling processing function, and a signaling output function.

According to various embodiments of the present disclosure, a control function transfer technology can be implemented to moves/loads a control function contained in a network node (NF) into another NF, so that signalings between respective NFs which occur during signaling processing associated with a UE may be reduced and a delay that occurs during signaling processing with respect to the UE may be reduced.

According to various embodiments of the disclosure, the requirement/performance of a service type supported in 5G may be effectively supported.

BRIEF DESCRIPTION OF THE DRAWINGS

FIG. 10 is a diagram illustrating the content of information associated with a micro NF according to an embodiment of the present disclosure.

DETAILED DESCRIPTION OF THE EXEMPLARY EMBODIMENTS

Hereinafter, embodiments of the present disclosure will be described with reference to the accompanying drawings.

The present disclosure takes into consideration a 5G communication system recently introduced.

A 5G communication system accepts as many user equipments (UEs) as limited radio resources allow, and supports various service types such as an enhanced mobile broadband (eMBB)/massive machine type communications (mMTC)/ultra-reliable and low latency communications (URLLC), and the like.

Particularly, a URLLC service supported in the 5G communication system is very important from the perspective of usability by a user of a UE. Various researches are being conducted in order to support the same.

In 5G, a network structure is defined to support a UE, a base station (access), a core, and a server end to end.

Particularly, in 5G, unlike the legacy LTE (4G), a network structure which is divided as an area of a control signaling function (control plane) and an area of a data transmission/reception function (user plane) is defined.

In this instance, a network node in the control plane of 5G may be defined as an access and mobility function (AMF) corresponding to a function of controlling radio access of a UE, an authentication service function (AUSF) corresponding to a function of controlling an authentication procedure that authenticates whether a user is a legitimate subscriber, a policy control function (PCF) corresponding to a function of managing/controlling a policy such as subscriber information, subscription service information for each subscriber, payment or the like, a session management function (SMF) for managing/controlling a session for the use of a data service for each UE, a network repository function (NRF) corresponding to a function of managing/controlling information associated with each network node in a network, a network exposure function (NEF), a network slice selection function (NSSF), a user data management (UDM), an application function (AF), or the like.

Each network node (also referred to as a control node) of the control plane may perform a unique control function that the corresponding network node is in charge of, and the control function is referred to as a network function (NF).

In 5G, a network node (also referred to as a data node) of the user plane may be defined as a user plane function (UPF) that performs data transmission or reception between a UE and a server on a data network (e.g., Internet) via a session to the UE based on the control of (interoperation with) an SMF.

Figure 1:
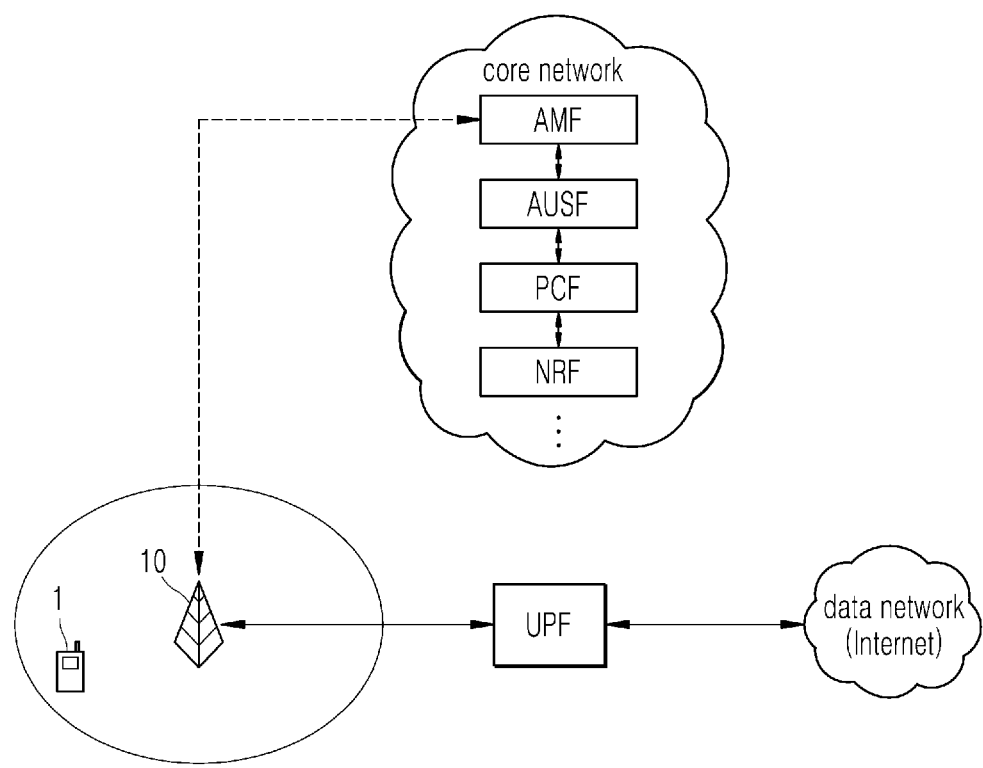
FIG. 1 is a diagram illustrating a 5G network system.

FIG. 1 is a diagram illustrating a 5G network system.

FIG. 1 illustrates an AMF, AUSF, PCF, and NRF as network nodes (NFs) of a control plane, and illustrates a UPF as an NF of a user plane, for ease of description.

In 5G, when signaling processing associated with a user equipment (UE) 1 is performed, respective NFs may transmit or receive a large number of signalings therebetween, in order to enable each network node, that is, each NF, to perform a control function that the corresponding NF is in charge of, and to perform signaling processing.

Particularly, in the state of switching an operation state of the UE 1, for example, an attach state (e.g., Idle-to-Active) in which the UE 1 accesses a core network, a state (e.g., Active-to-Idle) in which the UE 1 is switched into an idle state, a state (UE handover) in which the UE 1 moves to another access end (e.g., a base station), and the like, respective NFs may receive and transmit a large number of signalings therebetween when signaling processing associated with the UE 1 is performed.

Accordingly, in 5G, since a large number of signalings are transmitted or received among physically independent respective NFs, that is, the AMF, AUSF, PCF, and the like, a delay in processing signaling associated with the UE 1 may occur.

Hereinafter, in the attach state (e.g., Idle-to-Active) in which the UE 1 accesses a core network, signalings among respective NFs when signaling processing associated with the UE 1 is performed will be described, briefly, with reference to FIG. 2.

Figure 2:
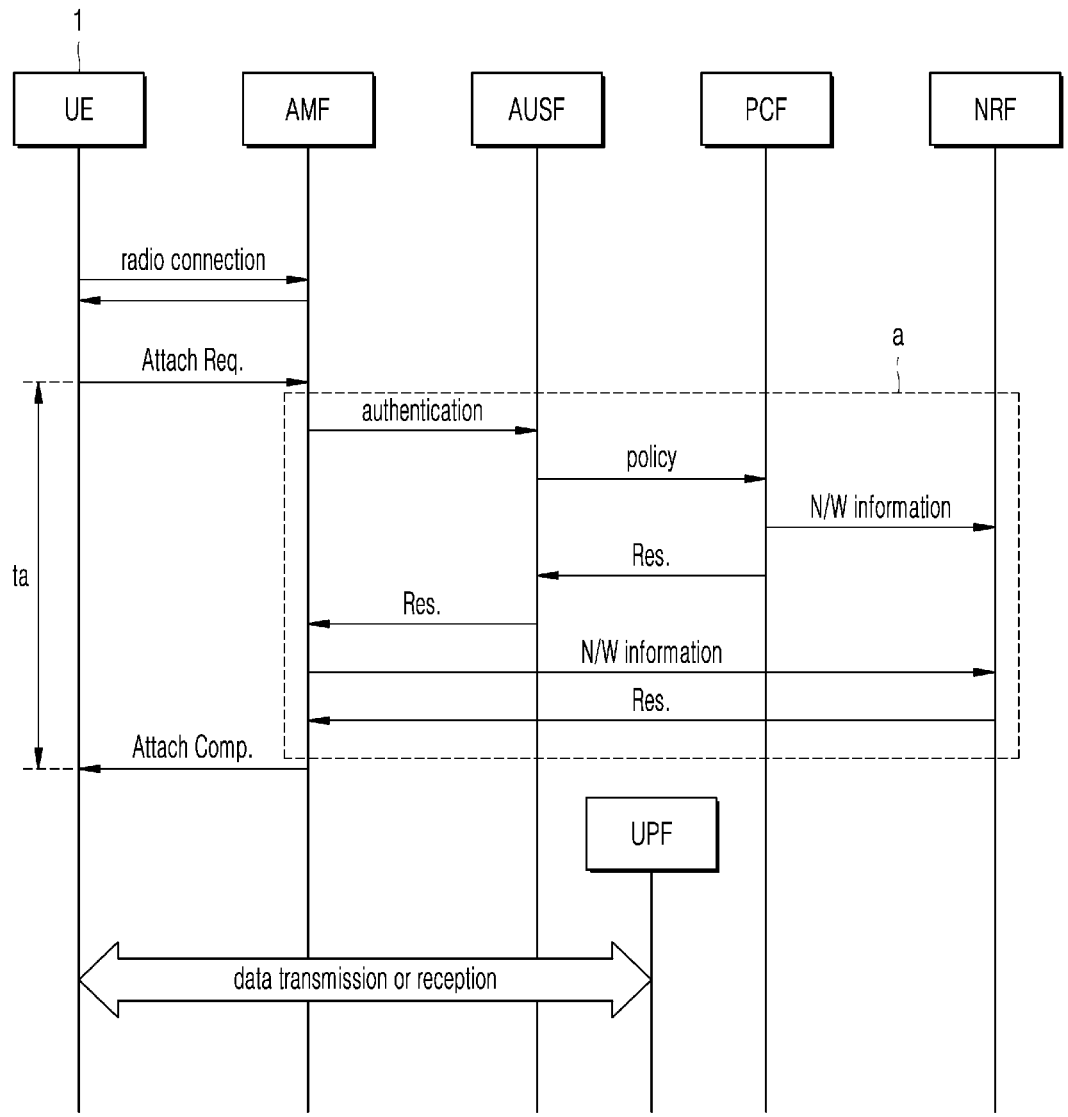
FIG. 2 is a diagram illustrating signalings among NFs when signaling processing associated with a user equipment (UE) is performed in a 5G network system.

As illustrated in FIG. 2, if a radio connection is established by signaling with an AMF via an access end, that is, a base station 10, the UE 1 transmits a request message to the AMF for accessing a core network.

In this instance, if a message is provided in the form of a message defined in 5G, the message may be qualified for a message (signaling) transmitted or received between NFs in addition to a request message that the UE 1 transmits to the AMF. Hereinafter, for ease of description, each message may be called by a name simplified based on the role of the corresponding message.

That is, if the UE 1 transmits an attach request message to the AMF for accessing a core network, the AMF transmits an authentication message that requests authentication of the UE 1 to the AUSF, which performs a control function of an authentication procedure. Accordingly, the AUSF transmits a policy message that requests a policy for the UE 1 to a PCF that performs a control function of policy/management.

The PCF transmits, to the AUSF, a response message delivering a policy such as subscription service information associated with the UE 1, payment, and the like. Accordingly, the AUSF performs an authentication procedure with respect to the UE 1 based on the received policy, and transmits a response message delivering the result of authentication (e.g., successful authentication) to the AMF.

Accordingly, the AMF transmits, to an NRF, an N/W information message that requests information (hereinafter, N/W information) associated with each network node (NF) related to the UE 1, receives a response message responding thereto, and transmits an attach complete message indicating that access to the core network is complete to the UE 1.

After the UE 1 receives the attach complete message and the access to the core network is complete, the UE 1 may perform transmission or reception of data over a data network (e.g., Internet) via an NF of the user plane, that is, a UPF.

As a matter of course, transmission or reception of a message (signaling) among respective NFs, that is, the AMF, AUSF, PCF, and NRF, which has been described with reference to FIG. 2 is merely an example, and the order of signaling and the type of signalings may be different depending on an order and a type defined in 5G.

As mentioned in the description made with reference to FIG. 2, in 5G, due to a large number of signalings transmitted or received among physically independent respective NFs, that is, the AMF, AUSF, PCF, and the like, a delay corresponding to a latency occurring for each signaling between NFs may occur when signaling processing associated with the UE 1 is performed.

Due to the delay in processing signaling, a user of the UE 1 may feel that a service start point at which data is actually transmitted or received comes late, which is a drawback.

However, in 5G, since a large number of signalings are transmitted or received among physically independent respective NFs, a large amount of delay occurs when signaling processing associated with a UE is performed. However, a scheme of removing the delay has not been provided.

The present disclosure is to provide a method of reducing a delay in signaling processing associated with a UE, by reducing signalings among respective NFs that occur during signaling processing with respect to the UE.

Particularly, the present disclosure is to provide a network system and a network device (network node) which are capable of implementing the new method (hereinafter, a control function transfer technology).

Hereinafter, with reference to FIG. 3, a network system according to an embodiment of the present disclosure will be described.

The present disclosure takes into consideration 5G, and thus, the network system proposed in the present disclosure may be understood as a 5G network system.

Figure 3:
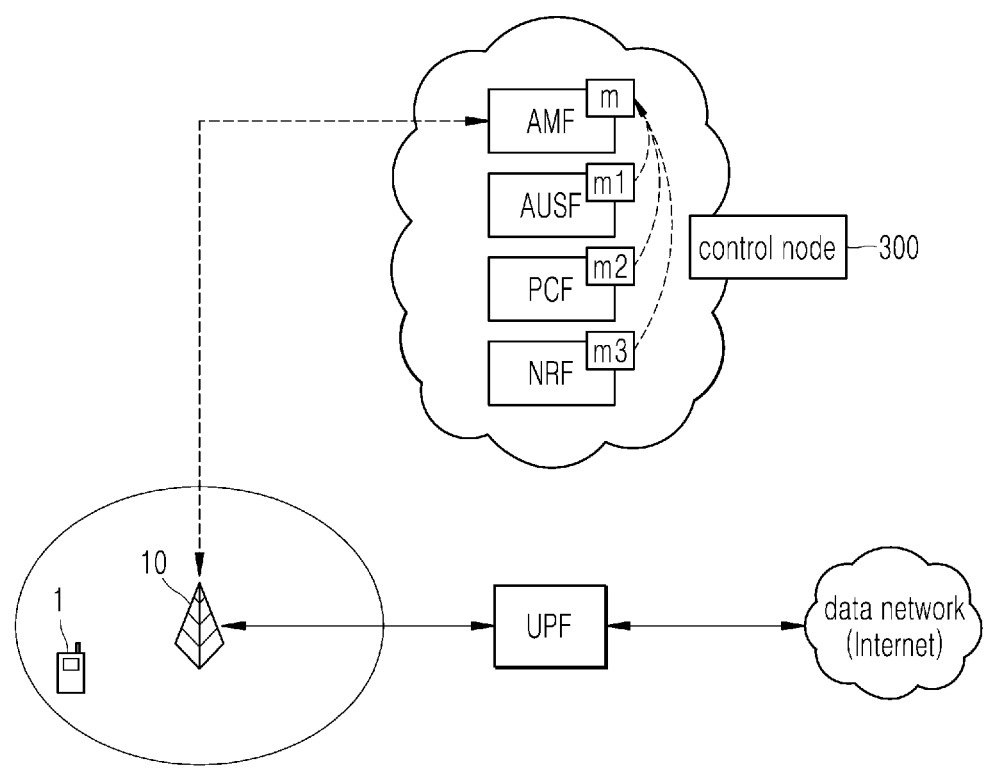
FIG. 3 is a diagram illustrating a network system according to an embodiment of the present disclosure.

As illustrated in FIG. 3, a network system according to an embodiment of the present disclosure includes a plurality of network nodes including at least one control function and a control node 300 which monitors the states of the plurality of network nodes, and loads a predetermined control function of a predetermined network node, which needs separation of a control function from among the plurality of network nodes, into another network node selected from among the plurality of network nodes.

The plurality of network nodes indicates respective network nodes, that is, respective NFs, of a control plane and a user plane in 5G. For ease of description, FIG. 3 illustrates an AMF, an AUSF, a PCF, and an NRF.

The control node 300 may be a separate network node located in a core network, or may be one of the existing network nodes, for example, an NRF or an NEF.

The control node 300 may monitor the states of the plurality of network nodes, that is, the plurality of NFs (AMF, AUSF, PCF, NRF, and the like).

For example, each NF, such as the AMF, AUSF, PCF, NRF, and the like, may report the state information of the corresponding NF to the control node 300 periodically or every time that a predetermined event occurs, so that the control node 300 may monitor the states of the plurality of NFs.

Here, the state information reported to the control node 300 may be information associated with an NF itself (e.g., an NF ID, common function handler (CFH) information, H/W, S/W), capability (e.g., the state of a usable resource), performance, an interface, and the like, which are provided based on a network node unit, that is, an NF unit. Furthermore, the state information may be information that further indicates information associated with a micro NF itself (e.g., micro NF ID), capability (e.g., the state of a usable resource), performance, an interface, and the like, which are provided based on a control function unit (including a micro NF to be described later) contained in an NF.

The control node 300 may load a predetermined control function of a predetermined NF that needs separation of a control function from among a plurality of NFs, into another NF selected from among the plurality of NFs, based on the monitored state of the plurality of NFs (AMF, AUSF, PCF, NRF, and the like).

Particularly, the control node 300 may request separation of a control function from the predetermined NF that needs separation of a control function from among the plurality of NFs.

In this instance, the control node 300 may select the predetermined NF that needs separation of a control function from among the plurality of NFs according to a predetermined policy, based on the monitored state of the plurality of NFs (AMF, AUSF, PCF, NRF, and the like).

For example, a policy may be assumed, which is defined to select an NF, which accepts at least a predetermined number of idle UEs that are expected to be in the attach situation (e.g., idle-to-active) that incurs a large number of signalings, or to select an NF which accepts idle UEs, the ratio of which is greater than or equal to a predetermined ratio when compared to the entire accepted UEs.

In this instance, according to the assumed policy, the control node 300 may select an NF that accepts at least a predetermined number of idle UEs or an NF that accepts idle UEs, the ratio of which is greater than or equal to a predetermined ratio when compared to the entire accepted UEs, as the predetermined NF from among the plurality of NFs (AMF, AUSF, PCF, NRF, and the like).

Alternatively, a policy may be assumed, which is defined to select an NF that accepts a UE that subscribes to a URLLC service, or an NF that accepts UEs subscribing to the URLLC services, the ratio of which is greater than or equal to a predetermined ratio when compared to the entire accepted UEs.

In this instance, according to the assumed policy, the control node 300 may select an NF that accepts a UE that subscribes to the URLLC service or an NF that accepts UEs that subscribe to the URLLC service, the ratio of which is greater than or equal to a predetermined ratio when compared to the entire accepted UEs, as the predetermined NF from among the plurality of NFs (AMF, AUSF, PCF, NRF, and the like).

The above-described definition of the policy is merely an example, and a predetermined NF that needs separation of a control function may be selected differently depending on the definition of a policy.

Alternatively, the control node 300 may randomly select a predetermined NF that needs separation of a control function from among the plurality of NFs, or may sequentially select a predetermined NF according to a defined order, irrespective of a policy.

Hereinafter, for ease of description, a description will be provided on the assumption that an AUSF, a PCF, and an NRF are selected as a predetermined NF that needs separation of a control function.

In this instance, the control node 300 requests separation of a control function from a predetermined NF that needs separation of a control function, that is, each of an AUSF, a PCF, and an NRF.

The NF (e.g., AUSF, PCF, NRF) that receives the control function separation request may distinguish a separable predetermined control function based on user context information from among at least one control function contained in the NF.

In this instance, the plurality of NFs may have the same separation policy for distinguishing a separable predetermined control function based on user context information, and may distinguish a separable predetermined control function based on the user context information according to the same separation policy.

Here, the user context may indicate UE location information, a signaling state such as idle/handover or the like, subscription service type information (e.g., URLLC), and the like, for each UE (user).

For example, based on the user context of accepted UEs (users), an NF (e.g., a PCF) may distinguish a control function independently implementable with respect to an idle UE that is expected to be in an attach situation (e.g., idle-to-active) that causes a large number of signalings and/or a UE that subscribes to the URLLC service from among accepted UEs, as a separable predetermined control function.

In this instance, an independently implementable control function, in other words, a separable control function, may be a control function performed based on a signaling processing unit. For example, it may be a control function of an authentication procedure, a control function of a policy/management, or a control function performed based on an operation unit of signaling processing (e.g., a control function of switching, routing, load balancing, packet encap/decap, and the like).

If the separable predetermined control function is distinguished, the NF (e.g., AUSF, PCF, and NRF) that receives the control function separation request may separate the predetermined control function as a control function (hereinafter, micro NF) virtualized to be transferable to another NF, and may transmit user context information associated with the separated predetermined control function, that is, a micro NF, to the control node 300.

Here, the user context information transmitted to the control node 300 may be information associated with a UE (user) which is an object to which the separated predetermined control function, that is, the micro NF, is to be applied.

For example, user context information may include information including subscriber information and session information (UE ID, UE capability, Slice ID, TE ID, QoS ID, Flow ID, resource allocation, B/W, latency, routing information, and the like), and the like.

Hereinafter, for ease of description, it is assumed that a virtualized control function (micro NF, hereinafter m1) is separated from the AUSF, a virtualized control function (micro NF, hereinafter m2) is separated from the PCF, and a virtualized control function (micro NF, hereinafter m3) is separated from the NRF.

If the user context information associated with a separable predetermined control function, that is, micro NF (e.g., m1, m2, and m3) is received from an NF (e.g., AUSF, PCF, and NRF) to which separation of a control function is requested, the control node 300 may select another NF that is capable of implementing the above-described micro NF (e.g., m1, m2, and m3) based on the received user context information from among the plurality of NFs (AMF, AUSF, PCF, NRF, and the like).

That is, the control node 300 may select another NF that is capable of implementing the above-described micro NF (m1) based on the user context information received from the AUSF, may select another NF that is capable of implementing the above-described micro NF (m2) based on the user context information received from the PCF, and may select another NF that is capable of implementing the above-described micro NF (m3) based on the user context information received from the NRF.

In this instance, the other NF that is selected to implement the micro NF (m2) separated from the PCF may be one of the NFs located closer to the UE 1 than the PCF according to the signaling procedure with the UE 1, from among the plurality of NFs (AMF, AUSF, PCF, NRF, and the like).

That is, as shown in FIG. 2, according to the signaling procedure with the UE 1, the order of locations closest to the UE 1 is AMF->AUSF->PCF->NRF. Accordingly, the other NF selected to implement the micro NF (m2) separated from the PCF may be the AMF or AUSF.

Particularly, the control node 300 may select one of the AMF and the AUSF as another NF capable of implementing the micro NF (m2) by taking into consideration whether the amount of resources is insufficient when the micro NF (m2) is implemented, whether a latency is greater than a threshold value, and the degree of proximity to the UE 1 (distance) or the like, using the user context received from the PCF, based on the monitored states of the AMF and AUSF located closer to the UE 1 than the PCF according to the signaling procedure with the UE 1.

In the case of the AUSF, the control node 300 may determine whether to select the AMF as another NF capable of implementing the micro NF (m1) in the same manner. In the case of the NRF, the control node 300 may select one of the AMF, AUSF, and PCF as another NF capable of implementing the micro NF (m3) in the same manner.

Hereinafter, for ease of description, a description will be provided on the assumption that the AMF is selected as another NF capable of implementing the micro NF (m1) of the AUSF, the micro NF (m2) of the PCF, and the micro NF (m3) of the NRF.

In the present disclosure, an NF from which a micro NF is separated is referred to as a parent NF, and another NF that loads the micro NF therein is referred to as a child NF.

The control node 300 enables a predetermined control function, that is, a micro NF (m1, m2, and m3), separated from a parent NF (e.g., the AUSF, PCF, and NRF), and corresponding user context information to be transferred to a child NF (e.g., the AMF), so as to load the predetermined control function, that is, the micro NF (m1, m2, and m3) into the child NF (e.g., the AMF).

For example, the control node 300 may command each parent NF (e.g., the AUSF, PCF, and NRF) to provide the separated predetermined control function, that is, the micro NF, and related user context information to the child NF (e.g., AMF).

Each of the AUSF, PCF, and NRF may provide (e.g., cache or migration) the separated micro NF and user context information related thereto to the AMF according to the command of the control node 300, so that the micro NF (m1, m2, and m3) may be loaded into the AMF.

A description will be provided with reference to the PCF. The PCF may provide, to the AMF, a message in which cacheable information (e.g., micro NF ID, user context identification information, and the like) associated with the micro NF (m2), separated from the PCF, and user context information related thereto is input into a predetermined field (cache).

Accordingly, the AMF may obtain the micro NF (m2) according to the micro NF ID, based on the information (e.g., micro NF ID, user context identification information, and the like) identified from the field included in the received message, and may load the micro NF (m2) therein (cache). In this instance, the AMF may obtain the micro NF (m2) according to the micro NF ID from the PCF, or from a separate predetermined data storage.

Also, for example, the PCF provides the micro NF (m2) separated from the PCF to the AMF and also provides user context information (e.g., user context identification information or the like) related to the micro NF (m2) to the AMF so that the AMF loads the same therein. However, the PCF deletes information (e.g., user context identification information or the like) stored in the PCF (migration).

Alternatively, the control node 300 may allow a child NF (e.g., AMF) to copy the predetermined control function separated from the parent NF (e.g., AUSF, PCF, and NRF), that is, the micro NF, and related user context information.

According to the command from the control node 300, each of the AUSF, PCF, and NRF may allow access by the AMF which desires to copy the micro NF separated from each of the AUSF, PCF, and NRF and user context information related thereto (copy), so that the micro NF (m1, m2, and m3) is loaded into the AMF.

For example, the PCF may allow access by the AMF which desires to copy the micro NF (m2) separated from the PCF and user context information related thereto (e.g., user context identification information or the like) (copy).

Accordingly, the AMF may access the micro NF (m2) and user context information related thereto (e.g., user context identification information or the like) included in the PCF, and may copy/obtain the same so as to load the same (copy) therein.

As described above, according to an embodiment of the present disclosure, a control function transfer technology may be implemented, which moves/loads a unique control function, which is contained to be static in a network node (NF) of a control/user plane of 5G, into another NF, particularly, an NF that is located closer to a UE according to the signal procedure with the UE.

Accordingly, in the present disclosure, based on the control function transfer technology implemented as described above, a delay in processing signaling associated with a UE may be decreased by reducing signalings among NFs during signaling processing associated with the UE.

Hereinafter, a network device (network node (NF)) that may reduce signalings among respective NFs by implementing the control function transfer technology proposed in the present disclosure, will be described in detail.

Figure 4:
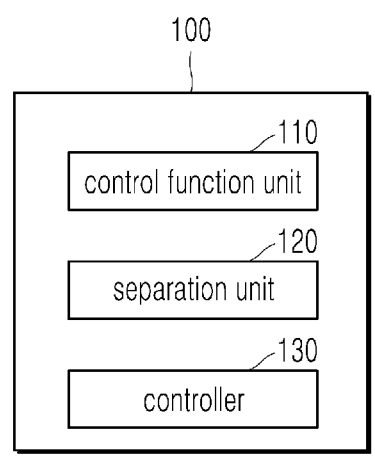
FIGS. 4 and 5 are block diagrams illustrating configurations of a network device (network node) according to an embodiment of the present disclosure.

As illustrated in FIG. 4, the network device 100 of the present disclosure may include a control function unit 110, a separation unit 120, and a controller 130.

Hereinafter, the network device 100 of the present disclosure may indicate an NF corresponding to a parent NF from the perspective of the control function transfer technology of the present disclosure.

The control function unit 110 may contain at least one control function.

For example, if the network device 100 of the present disclosure is a PCF, the control function unit 110 may contain a control function performed based on a signaling processing unit, for example, a control function of policy/management, a control function performed based on an operation unit in signaling processing, for example, a control function of switching, routing, and the like.

The separation unit 120 may distinguish a separable predetermined control function from among the at least one control function contained in the control function unit 110, based on user context information, and may separate and generate a predetermined control function.

Particularly, if a control function separation request is received from the control node 300, the separation unit 120 may distinguish a separable predetermined control function from among the at least one control function contained in the control function unit 110, based on the user context information.

In this instance, the separation unit 120 may distinguish the separable predetermined control function, based on the user context information, according to the same distinguishment policy that a plurality of NFs retains in order to distinguish a separable predetermined control function based on user context information.

For example, according to the policy for separation, the separation unit 120 may distinguish a control function independently implementable with respect to an idle UE that is expected to be in an attach situation (e.g., idle-to-active) that causes a large number of signalings and/or a UE that subscribes to the URLLC service from among accepted UEs based on user context information of the accepted UEs (users), as a separable predetermined control function.

In this instance, an independently implementable control function, in other words, a separable control function, may be a control function performed based on a signaling processing unit. For example, it may be a control function of an authentication procedure, a control function of a policy/management, or a control function performed based on an operation unit of signaling processing (e.g., a control function of switching, routing, load balancing, packet encap/decap, and the like).

Accordingly, if the separable predetermined control function is distinguished, the separation unit 120 may separate the distinguished predetermined control function and may generate a virtualized control function (hereinafter, micro NF) so as to be transferred to another NF.

In this instance, the generated micro NF via separation may include all logics and resources required for independently performing the corresponding predetermined control function.

The controller 130 may provide at least one of a predetermined control function generated via separation by the separation unit 120, that is, the micro NF, and user context information related thereto, to the control node 300, so that the predetermined control function, that is, the micro NF, is loaded into another network device, that is, another NF, selected by the control node 300 based on the user context information.

For example, the controller 130 may provide the user context information associated with the predetermined control function generated via separation by the separation unit 120, that is, the micro NF, to the control node 300 in response to the control function separation request received from the control node 300.

Here, the user context information associated with the micro NF may be information associated with a UE (user) which is an object to which the predetermined control function generated via separation, that is, the micro NF, is to be applied.

For example, user context information may include subscriber information and session information (UE ID, UE capability, slice ID, TE ID, QoS ID, flow ID, resource allocation, B/W, latency, routing information, and the like), and the like.

Hereinafter, for ease of description, it is assumed that the network device 100 of the present disclosure is a PCF, and a predetermined control function generated via separation from the network device 100 of the present disclosure, that is, a micro NF, is m2.

Accordingly, the control node 300 may select another NF capable of implementing the micro NF (m2) generated via separation from the network device 100 (e.g., a PCF), based on user context information received from the network device 100 of the present disclosure (e.g., the PCF).

In this instance, the other NF that is selected to implement the micro NF (m2) separated from the network device 100 (e.g., the PCF) may be one of an AMF or an AUSF located closer to the UE 1 than the network device 100 (e.g., the PCF), from among the plurality of NFs (AMF, AUSF, PCF, NRF, and the like), according to the signaling procedure with the UE 1.

Hereinafter, for ease of description, a description will be provided on the assumption that an AMF is selected as another NF, which is selected in order to implement the micro NF (m2) generated via separation from the network device 100 (the PCF) of the present disclosure.

In this instance, from the perspective of the micro NF (m2) generated via separation from the network device 100 (e.g., the PCF) of the present disclosure, the network device 100 (e.g., the PCF) is a parent NF, and the AMF is a child NF.

The control node 300 may command the parent NF, that is, the network device 100 (e.g., the PCF) to provide the micro NF (m2) generated via separation and user context information related thereto to the child NF, that is, the AMF, or may command to allow the AMF copy the same.

Accordingly, the controller 130 may provide the micro NF (m2) generated via separation and the user context information related thereto to another network device, that is, the AMF which is selected as a child NF by the control node 300 (e.g., cache or migration), or may allow access by the AMF, which desires to copy the micro NF (m2) generated via separation and the user context information related thereto (copy) so that the micro NF (m2) is loaded into the child NF, that is, the AMF.

As described above, according to the network device 100 of the present disclosure, a control function transfer technology may be implemented in 5G, which separates and loads a unique control function (micro NF), which has been contained to be static in a network node (NF), to another NF, particularly, an NF that is located closer to a UE according to the signaling procedure with the UE.

In this instance, the predetermined control function (micro NF (m2)) which has been performed in the PCF is moved/loaded into the AMF which is located closer to the UE than the PCF. Accordingly, signalings between the AMF and PCF in the signaling processing procedure associated with the UE 1 (limited to a UE which is specified as an object to which the micro NF (m2) is applied based on user context information) may be processed inside the AMF.

Accordingly, according to the present disclosure, the number of signalings during signaling processing associated with a UE defined in 5G may be dramatically reduced when compared to the existing number of signalings.

Furthermore, the control function unit 110 may update and manage information related to the micro NF (m2) among the at least one control function contained in advance, according to update information received continuously or based on a predetermined period from the micro NF (m2) of the child NF, that is, AMF.

Particularly, since the predetermined control function (micro NF (m2)), which was performed in the network device 100 (e.g., the PCF), has been moved/loaded into the AMF, a predetermined signaling which needs to be transferred (transmitted) to the network device 100 (PCF) in the signaling processing procedure associated with the UE 1 (limited to a UE which is specified as an object to which the micro NF (m2) is to be applied based on user context information) may be processed by the micro NF (m2) in the AMF.

In this instance, the original predetermined control function contained in the network device 100 (e.g., the PCF) may need to be aware of what is performed/processed and for which UE (user) in the micro NF (m2) in the AMF, on behalf of the original predetermined control function.

To this end, the micro NF (m2) of the child NF, that is, the AMF, may continuously provide update information (or result information) related to signaling processing every time a signaling is processed, to the network device 100 (e.g., the PCF) directly or via the control node 300.

Alternatively, the micro NF (m2) of the child NF, that is, the AMF, may store update information (or result information) related to signaling processing every time a signaling is processed, and may provide the stored/accumulated update information to the network device 100 (e.g., the PCF) directly or via the control node 300, based on a predetermined period set in advance.

Accordingly, the control function unit 110 may update and manage information related to the original predetermined control function corresponding to the micro NF (m2) among the at least one control function contained in advance, according to the update information (or result information) received continuously or based on a predetermined period from the micro NF (m2) of the child NF, that is, AMF.

Therefore, the original predetermined control function contained in the network device 100 (e.g., the PCF) may recognize/manage what is performed/processed and for which UE (user) in the micro NF (m2) in the AMF, on behalf of the original predetermined control function.

Figure 5:
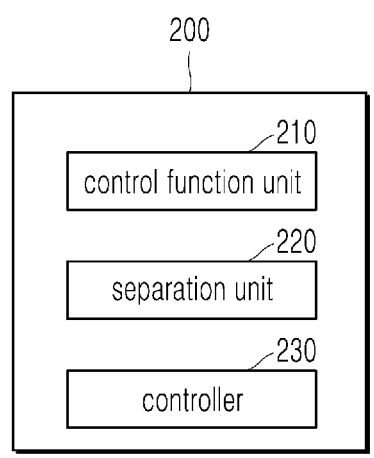

A network device 200 of the present disclosure in FIG. 5 is a network node (NF) corresponding to a child NF from the perspective of the control function transfer technology of the present disclosure.

The network device 200 of the present disclosure may include a control function unit 210 and a controller 230.

The network device 200 of the present disclosure may further include a separation unit 220. In this instance, the network device 200 may operate as a parent NF, which has been described above.

The control function unit 210 may contain at least one control function.

For example, if the network device 200 is an AMF, the control function unit 210 may contain a control function performed based on a signaling processing unit, for example, a control function of radio access, and a control function performed based on an operation unit in signaling processing, for example, a control function of switching, routing, load balancing and the like.

The controller 230 may obtain a predetermined control function (micro NF) generated via separation from another network device, for example, a parent NF (e.g., a PCF) based on user context information.

Particularly, the controller 230 may recognize a predetermined control function of the parent NF (e.g., the PCF), that is, the micro NF (m2), which is to be moved/loaded from the control node 300.

The controller 230 may receive the predetermined control function of the parent NF (e.g., the PCF), that is, the micro NF (m2), and user context information related thereto, from the control node 300 or another NF, that is, the parent NF (e.g., the PCF) (e.g., cache or migration), or may obtain the micro NF (m2) generated via separation from the parent NF (e.g., the PCF) by accessing the parent NF (e.g., the PCF) and copying the micro NF (m2) and user context information related thereto.

Accordingly, the controller 230 may obtain the predetermined control function generated via separation from the parent NF (e.g., the PCF), that is, the micro NF (m2), so that the predetermined control function of the other NF, that is, the PCF, is loaded into the network device 200 (e.g., the AMF).

In this instance, each control function contained in advance in the control function unit 210 may transfer a predetermined signaling associated with user context information which needs to be transferred to the predetermined control function of the other NF, that is, the PCF, among signalings associated with a UE, to the predetermined control function of the controller 230, that is, the micro NF (m2), instead of transferring the predetermined signaling to the PCF, so that the predetermined signaling is processed in the network device 200 (e.g., the AMF).

Particularly, in the process of processing signaling associated with a UE by performing a control function, each control function contained in advance in the control function unit 210 may distinguish a UE specified as an object to which the micro NF (e.g., m2) is to be applied based on the user context information of the moved/loaded micro NF (e.g., m2).

Hereinafter, for ease of description, a description will be provided on the assumption that the UE 1 is a UE (user) specified as an object to which the micro NF (e.g., m2) is to be applied.

Accordingly, in the process of processing signaling associated with the UE 1 (a UE specified as an object to which the micro NF (m2) is to be applied) by performing a control function, each control function contained in advance in the control function unit 210 may transmit a predetermined signaling associated with user context information which needs to be transmitted to the predetermined control function of the PCF to the micro NF (m2) of the controller 230, instead of transferring the predetermined signaling to the PCF.

In this instance, the predetermined control function (micro NF (m2)) moved/loaded into the network device 200 (e.g., the AMF) of the present disclosure may process the signaling using a signaling processing device for processing a signaling associated with the UE 1 (limited to a UE specified as an object to which the micro NF (m2) is to be applied based on user context information), on behalf of the PCF, and thus, signalings used to be transmitted or received between the AMF and PCF may be processed inside the network device 200 (e.g., the AMF).

Furthermore, if the amount of resources for performing the moved/loaded micro NF (e.g., m2) of the other NF (e.g., the PCF) becomes insufficient, each control function contained in advance in the control function unit 210 may transfer a predetermined signaling, that is, a signaling associated the UE 1 which used to be transferred to the moved/loaded micro NF (e.g., m2) of the other NF (e.g., the PCF), to the original predetermined control function contained in the other NF (e.g., the PCF).

The moved/loaded micro NF (e.g., m2) of the other NF (e.g., the PCF) may be loaded and maintained in the controller 230 during a predetermined loaded state time after loading, or until the amount of resources for performing the predetermined control function (e.g., micro NF (e.g., m2) becomes insufficient.

Therefore, if the predetermined loaded state time of the moved/loaded micro NF (e.g., m2) of the other NF (e.g., the PCF) elapses, each control function contained in advance in the control function unit 210 may transfer a predetermined signaling, that is, a signaling associated the UE 1 which used to be transferred to the moved/loaded micro NF (e.g., m2) of the other NF (e.g., the PCF), to the original predetermined control function contained in the other NF (e.g., the PCF).

As described above, according to the network device 200 of the present disclosure, in 5G, a control function transfer technology may be implemented, which separates and loads a unique control function, which has been contained to be static in a network node (NF), into another NF, particularly, an NF that is located closer to a UE according to the signal procedure with the UE.

Hereinafter, with reference to FIG. 6, in the attach situation (e.g., idle-to-active) in which the UE 1 accesses a core network, as illustrated in FIG. 2, the situation in which signalings among respective NFs are reduced according to the present disclosure will be briefly described.

Figure 6:
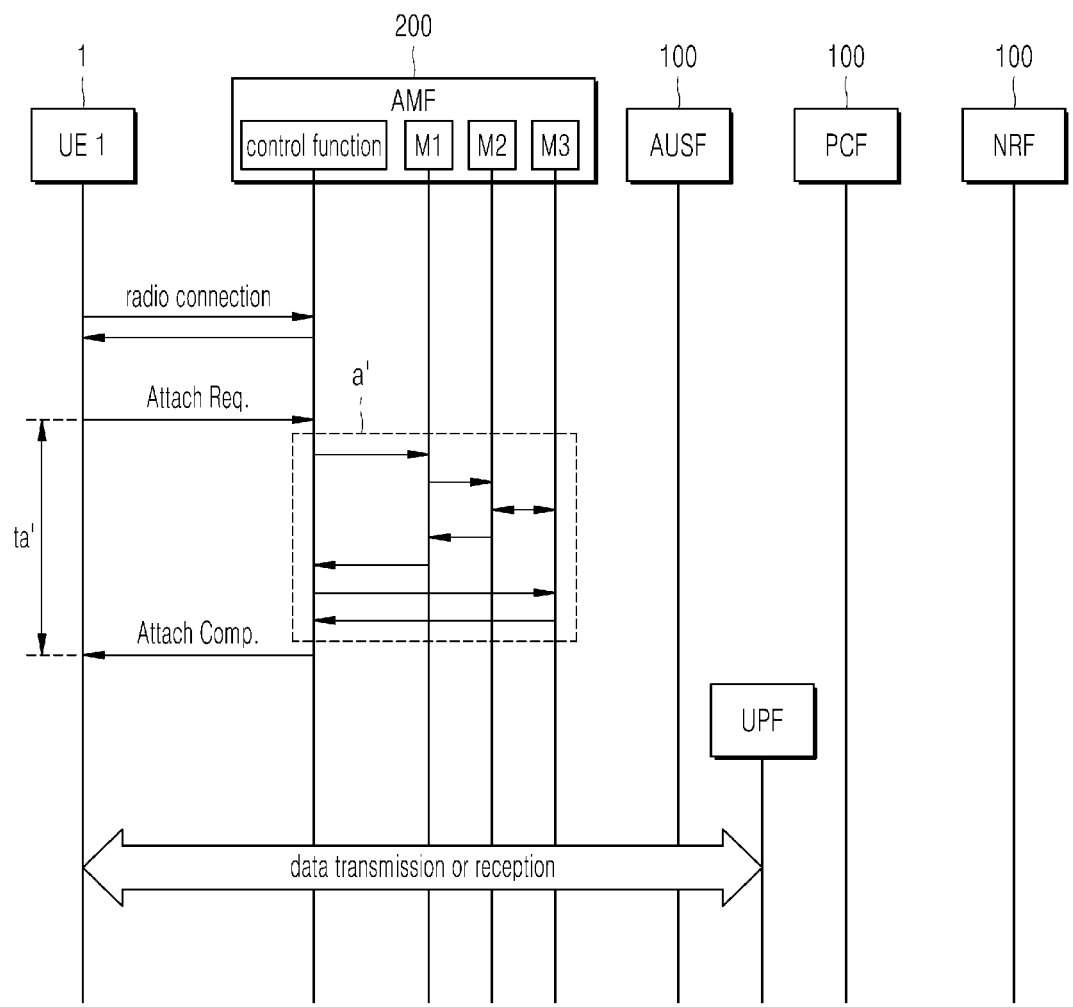
FIG. 6 is a diagram illustrating signalings among NFs when signaling processing associated with a UE is performed in a network system according to an embodiment of the present disclosure.

FIG. 6 assumes the situation in which micro NFs (e.g., m1, m2, and m3) generated via separation from each of an AUSF, a PCF, and an NRF are moved/loaded into an AMF, according to a control function transfer technology.

A description will be provided on the assumption that the UE 1 is a UE which is specified as an object to which all m1, m2, and m3 are to be applied, based on user context information of each of m1, m2, and m3.

As illustrated in FIG. 6, the UE 1 may establish a radio connection by signaling with the AMF via an access end, that is, the base station 10.

If the radio connection is established, the UE 1 may transmit an attach request message to the AMF in order to access a core network. The AMF (an original control function) may transmit an authentication message for requesting authentication of the UE 1 to m1 moved/loaded from the AUSF, as opposed to the AUSF that performs a control function of an authentication procedure. Accordingly, m1 transmits a policy message for requesting the policy associated with the UE 1 to m2 moved/loaded from the PCF, instead of the PCF that performs a control function of policy/management.

In this instance, m2 transmits, to m1, a response message including a policy such as subscription service information associated with the UE 1, payment and the like. Accordingly, m1 performs an authentication procedure with respect to the UE 1 based on the received policy, and transmits a response message including the result of authentication (e.g., successful authentication) to the AMF (the original control function).

Accordingly, the AMF (the original control function) transmits an N/W information message that requests information (hereinafter, N/W information) associated with each network node (NF) related to the UE 1 to m3 moved/loaded from the NRF, instead of the NRF, receives a response message responding thereto, and transmits an attach complete message indicating that access to the core network is complete to the UE 1.

After the UE 1 receives the attach complete message and the access to the core network is complete, the UE 1 may perform transmission or reception of data over a data network (e.g., Internet) via a data node of the user plane, that is, a UPF.

As described with reference to FIG. 6, upon comparison of a signaling a' of FIG. 6 according to the control function transfer technology of the present disclosure and a signaling a of FIG. 2, it is recognized that the number of signalings among physically independent respective NFs, that is, the AMF, AUSF, PCF, NEF, and the like may be dramatically reduced according to the present disclosure.

Accordingly, a latency may be reduced by ta of FIG. 2—ta' of FIG. 6 according to a decrease in the signalings when compared to the existing signaling, and a service start point at which data is actually transmitted or received may come earlier.

Particularly, according to the control function transfer technology of the present disclosure, from the perspective of a user, a UE does not need to change the design, and the user may not experience inconvenience due to movement/loading of a control function.

Accordingly, in the present disclosure, a control function transfer technology that moves/loads a control function contained in a network node (NF) into another NF is implemented, so that signalings among respective NFs during signaling processing associated with a UE may be reduced and a delay in processing signaling associated with the UE may be reduced, and the requirement/performance of a service type supported in 5G may be efficiently supported.

Figure 7:
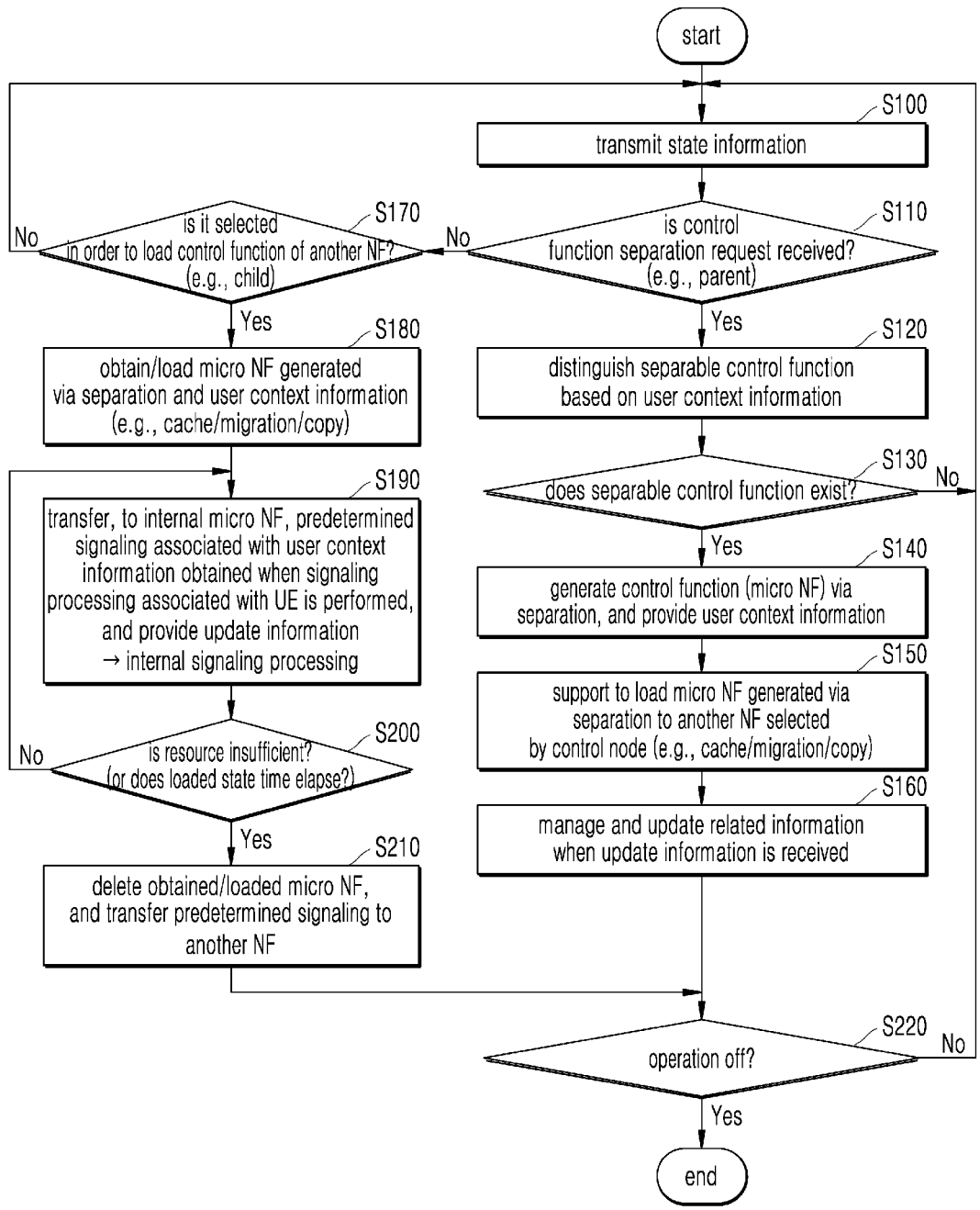
FIG. 7 is a flowchart illustrating an operation method of a network device (network node) according to an embodiment of the present disclosure.

Hereinafter, with reference to FIG. 7, an operation method of a network device (network node) according to an embodiment will be described.

The network device according to the present disclosure may be a parent NF that separates/generates a contained control function, or may be a child NF into which a control function (micro NF) of another NF is to be moved/loaded.

Hereinafter, for ease of description, an operational flow when the network device of the present disclosure is a parent NF and an operational flow when the network device is a child NF will be described separately with reference to FIG. 7. The operational flow in the case of a parent NF will be described first.

The network device (NF) of the present disclosure may report (transmit) the state information of the corresponding NF to the control node 300 periodically or every time that a predetermined event occurs in operation S100, so that the control node 300 may monitor the states of a plurality of NFs.

Accordingly, the control node 300 may select a predetermined NF that needs separation of a control function from among the plurality of NFs, based on the monitored states of the plurality of NFs (AMF, AUSF, PCF, NRF, and the like).

If the network device (NF) of the present disclosure is selected by the control node 300 as a predetermined NF that needs separation of a control function, the network device (NF) may receive a control function separation request in operation S110 (Yes).

If the network device (NF) receives the control function separation request in operation S110 (Yes), the network device (NF) may distinguish a separable predetermined control function based on user context information from among at least one control function contained in the corresponding network device (NF), in operation S120.

For example, the network device (NF) of the present disclosure may distinguish a control function independently implementable with respect to an idle UE that is expected to be in an attach situation (e.g., idle-to-active) that causes a large number of signalings and/or a UE that subscribes to the URLLC service from among accepted UEs, based on the user context information of the accepted UEs (users), as a separable predetermined control function.

If the separable predetermined control function exists in operation S130 (Yes), the network device (NF) of the present disclosure may separate and generate the distinguished predetermined control function as a control function (hereinafter, a micro NF) virtualized to be transferred to another NF, and transmit user context information associated with the predetermined control function generated via separation, that is, a micro NF, to the control node 300 in operation S140.

If the user context information associated with the separable predetermined control function, that is, the micro NF, is received from an NF from which the control node 300 requests separation of a control function, the control node 300 may select another NF that is capable of implementing the above-described micro NF based on the received user context information from among the plurality of NFs (AMF, AUSF, PCF, NRF, and the like).

The control node 300 may command the network device (NF) of the present disclosure, which is the parent NF, to provide the predetermined control function generated via separation, that is, the micro NF, and the user context information related thereto, to the selected child NF, or may command the child NF to copy the corresponding micro NF and the user context information related thereto.

Accordingly, the network device (NF) of the present disclosure may provide the micro NF generated via separation and related user context information to another NF, that is, the child NF, selected by the control node 300 (e.g., cache or migration), or may allow the child NF to access and copy the micro NF and the related user context information so that the micro NF generated via separation is moved/loaded into the child NF in operation S150.

The network device (NF) of the present disclosure may update and manage information related to the original control function corresponding to the micro NF from among the at least one control function contained in advance, according to update information (or result information) received from the micro NF of the child NF which has been moved/loaded from the network device (NF), in operation S160, so that the original predetermined control function contained in the network device 100 (e.g., a PCF) may recognize/manage what is performed/processed and for which UE (user) in the micro NF (m2) in the AMF, on behalf of the network device (NF).

Hereinafter, an operational flow when the network device of the present disclosure is a parent NF will be described.

The network device (NF) of the present disclosure may recognize whether the network device (NF) is selected by the control node 300 as a child NF into which a micro NF of another NF, that is, a parent NF, is to be moved/loaded in operation S170.

For example, if the network device (NF) of the present disclosure recognizes a predetermined control function, that is, the micro NF, of the parent NF to be moved/loaded from the control node 300, the network device may recognize that the network device is selected as a child NF in operation S170 (Yes).

If it is recognized that the network device (NF) is selected as a child NF in operation S170 (Yes), the network device (NF) may receive the predetermined control function of the parent NF, that is, the micro NF, and user context information related thereto from the control node 300 or the parent NF which is another NF (e.g., cache or migration), or may access the parent NF so as to copy the micro NF and related user context information, so that the predetermined control function generated via separation from the parent NF, that is, the micro NF, may be obtained and may be loaded in operation S180.

Accordingly, the network device (NF) of the present disclosure may transfer a predetermined signaling associated with user context information which needs to be transferred to the predetermined control function of the parent NF, that is, the other NF, from among signalings associated with the UE, to the moved/loaded predetermined control function, that is, the micro NF, instead of the parent NF, so that the predetermined signaling is processed in the network device (NF) in operation S190.

The network device (NF) of the present disclosure may provide update information (or result information) related to signaling processing to the parent NF directly or via the control node 300, every time that a signaling is processed in the moved/loaded predetermined control function, that is, the micro NF.

Alternatively, the network device (NF) of the present disclosure may store the update information (or result information) related to signaling processing every time that a signaling is processed in the moved/loaded predetermined control function, that is, the micro NF, and may provide the stored/accumulated update information (or result information) to the parent NF directly or via the control node 300, based on a predetermined period.

If the amount of resources for performing the predetermined control function, that is, the moved/loaded micro NF of the parent NF, becomes insufficient in operation S200 (Yes), other than the resources for performing each control function that was originally contained in the network device (NF), the network device (NF) of the present disclosure removes the moved/loaded micro NF of the parent NF, and transfers a signaling associated with the UE (1), which used to be transferred to the corresponding micro NF, to the parent NF in operation S210.

Alternatively, if a loaded state time elapses after the micro NF of the parent NF is moved/loaded into in operation S200 (Yes), the network device (NF) of the present disclosure deletes the moved/loaded micro NF of the parent NF, and transfers a signaling associated with the UE 1, which used to be transferred to the corresponding micro NF, to the parent NF, in operation S210.

As described above, according to a network system, a network device applied thereto, and an operation method of the device of the embodiments of the present disclosure, a control function transfer technology that moves/loads a control function contained in a network node (NF) into another NF is implemented, so that signalings among respective NFs during signaling processing associated with a UE may be reduced and a delay in processing signaling associated with the UE may be reduced, and the requirement/performance of a service type supported in 5G may be efficiently supported.

Figure 8:
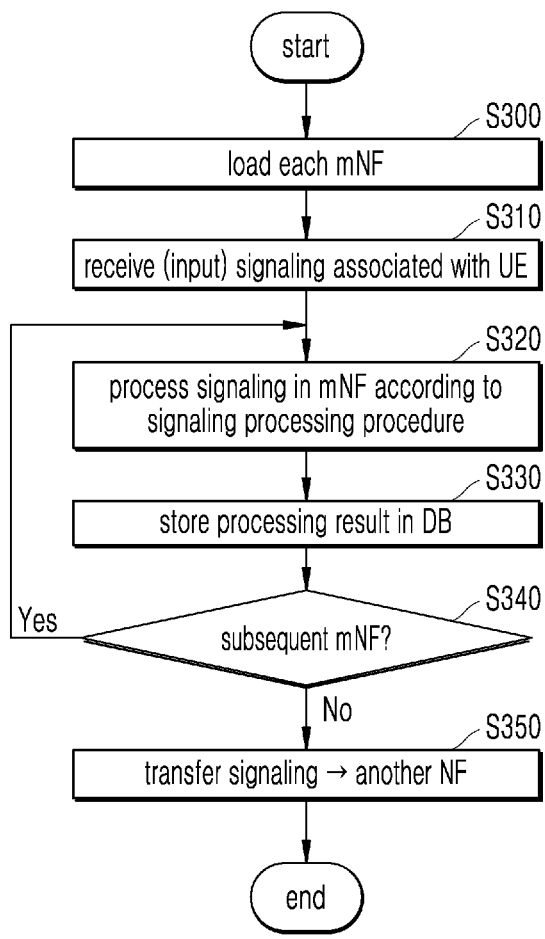
FIG. 8 is a flowchart illustrating an operation method of a network node according to an embodiment of the present disclosure.

FIG. 8 illustrates an operation method of a network node according to an embodiment of the present disclosure, particularly, an operation method of processing a signaling by the network node (NF).

As described above, the network node (NF) of the present disclosure corresponds to network nodes of a control plane and a user plane, that is, an AMF, AUSF, PCF, NRF, UPF, and the like.

According to the operation method of the network node (NF) of the present disclosure, at least one control function used for operation of the network node (NF) is contained in the network node (NF) in operation S300.

Figure 9:
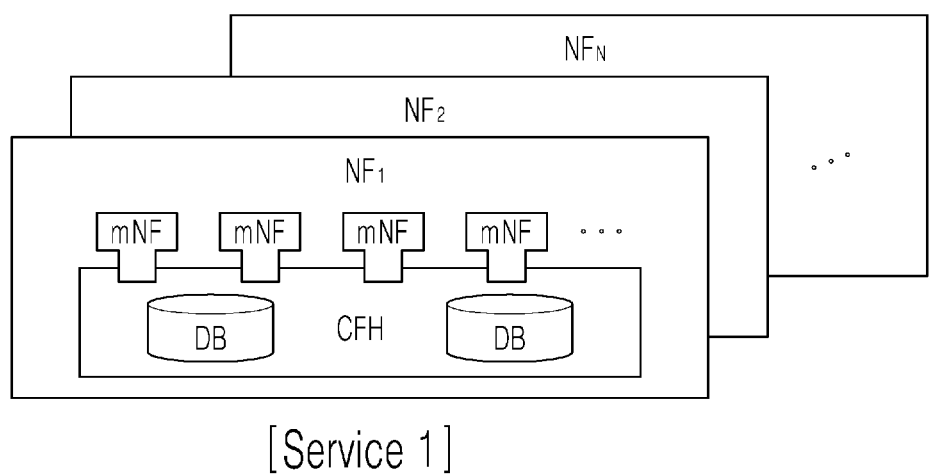
FIG. 9 is a conceptual diagram illustrating a structure (environment) of a micro NF according to an embodiment of the present disclosure.

That is, as illustrated in FIG. 9, the network node (e.g., NF1) basically contains at least one control function, that is, micro NF (hereinafter, mNF) for operation of the corresponding network node (e.g., NF1).

Each mNF contained in the network node (e.g., NF1) may be an mNF contained in advance in the network node (e.g., NF1), or may be an mNF which is moved/loaded from another NF (parent NF) as described above.

According to the operation method of the network node (NF) of the present disclosure, the network node (NF) performs at least one mNF contained in the network node (NF) and performs transferring among mNFs in association with a signaling associated with a UE, so as to process the current signaling in operations S310 to S350.

According to the operation method of the network node (NF) of the present disclosure, in the process of processing signaling, the network node (NF) stores result information related to signaling processing in a predetermined data storage every time that a signaling is processed, and does not retain the same in the mNF in operation S330.

According to embodiments of the present disclosure, a control function, that is, an mNF, may include at least one component in the form of software in order to perform a control function of the mNF itself.

That is, a component may be provided in the form of an S/W code patch, library, package, or plug-in, as the minimum unit for performing the control function of an mNF.

That is, a single mNF includes at least one component in the form of at least one of an S/W code patch, library, package, and plug-in, and may have a structure that performs the control function of an mNF based on at least one component configured as described above.

According to a detailed embodiment, each component may have a signaling input function, a signaling process function, and a signaling output function.

Therefore, an mNF that includes a component having signaling input/processing/output functions may support a stateless operation which does not retain information required for performing the control function of the corresponding mNF and/or information associated with the result of performance.

Hereinafter, the process (operations S310 to S350) in which the network node (NF) of the present disclosure processes a signaling associated with a UE, which is related to a predetermined service, will be described in detail.

Referring to FIG. 9, in order to provide a predetermined service (hereinafter, service 1) to a UE (user), a plurality of NFs (NF1, 2, . . . , and N) support service 1.

A description will be provided on the assumption that the network node (NF) of the present disclosure is one of the plurality of NFs (NF1, 2, . . . , and N) supporting service 1, and it is NF1

As illustrated in FIG. 9, the network node (e.g., NF1) of the present disclosure contains a plurality of mNFs for operation of the network node (e.g., NF1).

According to the operation method of the network node (NF) of the present disclosure, if a signaling associated with a UE which is related to service 1 is received (input) in operation S310, an mNF, which is a first main agent of processing in the network node (e.g., NF1) according to the predetermined signaling processing procedure, performs the control function of the mNF, so as to process the signaling in operation S320.

In this instance, the mNF includes a component having signaling input/processing/output functions and supports the stateless operation. Accordingly, the mNF may obtain/use information (e.g., user context or the like) required for processing a signaling from a predetermined data storage (hereinafter, a DB) related to service 1.

If a subsequent main agent mNF of processing according to the signaling processing procedure exists in the network node (e.g., NF1) in operation S340 (Yes), since the mNF, which is the current main agent of processing, includes a component having signaling input/processing/output functions and supports the stateless operation, the mNF only transfers (outputs) required signaling to the subsequent main agent mNF of processing but does not retain result information related to the current processing.

According to the operation method of the network node (NF) of the present disclosure, the result information associated with signaling processing performed by the mNF, which is the first main agent of processing, may be stored in a predetermined data storage related to service 1 in operation S330.

Here, the result information may include user context information associated with at least one of a UE, a service of a signaling, that is service 1, and the state information of the mNF which is a control function that performs signaling processing, that is, the main agent of processing.

A detailed embodiment will be provided. The network node (e.g., NF1) of the present disclosure may include a common function handler (CFH) for interoperating with/ controlling/managing a plurality of mNFs.

The CFH may include an H/W configuration having a network function virtualization (NFV) infrastructure, and an S/W OS, and may be configured in the form of an NFV infrastructure (NFVI), an infrastructure as a service (IaaS), and a platform as a service (Paas).

Particularly, the CFH has a compatibility/dependency rule associated with an mNF included in an NF (e.g., NF1). Based on the rule, the CHF may perform interoperation/ control/management. For example, the CHF may enable each mNF to communicate with each other, or to transfer (output) a signaling according to a signaling processing procedure, may obtain, from a DB, information that each mNF requires so as to provide the same, and may store result information obtained when each mNF performs signaling processing.

FIG. 10 is a diagram illustrating the content of information associated with a micro NF according to an embodiment of the present disclosure.

FIG. 10 illustrates the content of information associated with an mNF by assuming a single mNF that is included in an NF that supports an IoT service.

As illustrated in FIG. 10, the information associated with the mNF may include a micro NF name or micro NF ID, the form and version of each component, a description of each component, resource related information of each component, and the like.

A CFH may manage information as illustrated in FIG. 10, for each mNF included in the NF (e.g., NF1).

According to the operation method of the network node (NF) of the present disclosure, the CFH stores result information associated with signaling processing performed by the mNF, which is a first main agent of processing, in a DB in operation S330.

According to the operation method of the network node (NF) of the present disclosure, if a signaling associated with a UE which is related to service 1 is received (input) in operation S310, the mNF, which is the first main agent of processing in the network node (e.g., NF1) according to a predetermined signaling processing procedure, transfers (inputs) a signaling to an mNF which is a second main agent of processing, and the mNF corresponding to the second main agent of processing may perform the control function of itself, so as to process the signaling in operation S320.

In this instance, since the mNF supports a stateless operation, and thus, the mNF may obtain/use information required for processing the signaling from a DB using the CFH.

According to the operation method of the network node (NF) of the present disclosure, the CFH stores result information associated with signaling processing performed by the mNF, which is the second main agent of processing, in a DB in operation S330.

Since the mNF, which is the current main agent of processing, supports the stateless operation, if an mNF corresponding to a subsequent main agent of processing according to the signaling processing procedure exists in the network node (e.g., NF1) in operation S340 (Yes), the mNF corresponding to the current main agent of processing may transfer (output) a required signaling to the mNF corresponding to the subsequent main agent of processing, and if the mNF corresponding to the subsequent main agent of processing does not exist in operation S340 (No), the mNF corresponding to the current main agent of processing may transfer (output) a required signaling to another NF, that is, a subsequent NF (e.g., NF2) that supports service 1 in operation S350.

As described above, according to embodiments of the present disclosure, each mNF in a network node performs the control function of the corresponding mNF so as to merely process a signaling, and supports a stateless operation. All result information related to signaling processing in each mNF may be stored in a stateful DB. In this manner, the signaling processing process of an NF is implemented.

According to the signaling processing structure of an NF, an mNF may be easily generated in an NF as it is needed.

For example, in the case in which an mNF that abnormally operates exists in an NF, although the NF that abnormally operates is removed and a new mNF that provides the same control function is contained, all information (e.g., state information and user context information) are stored in the stateful DB since the mNF supports the stateless operation, and thus, the NF may normally process a signaling.

The operation method of the network device (network node) according to the various embodiments of the present disclosure may be implemented in the form of program commands executed by various computer means, and may be recorded in a computer readable medium. The computer readable medium may include a program command, a data file, a data structure, and the like independently or in combination. The program command recorded in the medium may be things specially designed and configured for the present disclosure, or things that are well known to and can be used by those skilled in the computer software related art. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware device may be configured to operate as one or more software modules in order to perform operations of the present disclosure, and vice versa.

Although the present disclosure has been described in detail with reference to exemplary embodiments, the present disclosure is not limited thereto and it is apparent to those skilled in the art that various modifications and changes can be made thereto without departing from the scope of the present disclosure.

What is claimed is:

1. A network system, comprising:
a plurality of network nodes configured to contain at least one control function; and
a control node configured to load a predetermined control function of a predetermined network node into another network node selected from the plurality of network nodes, the predetermined network node being required to separate a control function.

2. The network system of claim 1, wherein, when the control node requests separation of a control function to the predetermined network node and receives a context information response associated with the predetermined control function from the predetermined network node, the control node selects another network node which is capable of implementing the predetermined control function based on the context information from the plurality of network nodes.

3. The network system of claim 2, wherein the control node allows the predetermined control function separated from the predetermined network node and the context information to be transferred to the another network node, so as to load the predetermined control function into the another network node.

4. A network device, comprising:
a control function unit configured to contain at least one control function;
a separation unit configured to separate a predetermined control function based on user context information from the at least one control function; and
a controller configured to provide at least one of the predetermined control function and the user context information to a control node, so that the predetermined control function is loaded into another network device, which is selected by the control node based on the user context information.

5. The network device of claim 4, wherein the another network device is one of network devices located closer to a user equipment (UE) than the network device in a signaling procedure with the UE.

6. The network device of claim 4, wherein the controller is configured to provide the predetermined control function and the user context information to the another network device, or to allow the another network device to copy the predetermined control function and the user context information, so as to load the predetermined control function into the another network device.

7. The network device of claim 4, wherein the control function unit is configured to manage and update information associated with the predetermined control function of the at least one control function according to update information received from the predetermined control function of the another network device continuously or periodically.

8. An operation method of a network device, the method comprising:
separating a predetermined control function based on user context information from at least one control function; and
providing at least one of the predetermined control function and the user context information to a control node, so that the predetermined control function is loaded into another network device selected by the control node based on the user context information.

9. The method of claim 8, further comprising:
providing, by the control node, the predetermined control function and the user context information to the another network device, or allowing the another network device to copy the predetermined control function and the user context information, so as to load the predetermined control function into the another network device.

10. The method of claim 8, further comprising:
managing and updating information related to the predetermined control function of the at least one control function according to update information received from the predetermined control function of the another network device continuously or periodically.

* * * * *